(12) United States Patent
Wu et al.

(10) Patent No.: US 8,990,700 B2
(45) Date of Patent: Mar. 24, 2015

(54) RATING AND REVIEW INTERFACE

(75) Inventors: Eric Jihjung Wu, San Francisco, CA (US); Evelyn Kim, New York, NY (US); Taj J. Campbell, San Francisco, CA (US); Janet Yuen Ting Cheung, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/285,990

(22) Filed: Oct. 31, 2011

(65) Prior Publication Data
US 2015/0040018 A1   Feb. 5, 2015

(51) Int. Cl.
G06F 3/00    (2006.01)
G06F 3/048   (2013.01)

(52) U.S. Cl.
USPC ............ 715/738; 715/733; 715/780; 715/764

(58) Field of Classification Search
None
See application file for complete search history.

(56) References Cited

U.S. PATENT DOCUMENTS

| | | | | |
|---|---|---|---|---|
| 5,774,121 | A * | 6/1998 | Stiegler | 715/769 |
| 5,973,683 | A * | 10/1999 | Cragun et al. | 715/719 |
| 6,601,057 | B1 * | 7/2003 | Underwood et al. | 715/207 |
| 7,370,285 | B1 * | 5/2008 | Nickerson et al. | 715/808 |
| 7,509,230 | B2 | 3/2009 | Fernandez et al. | |
| 7,756,970 | B2 * | 7/2010 | Ebert et al. | 709/224 |
| 8,255,828 | B2 * | 8/2012 | Harris et al. | 715/810 |
| 8,332,232 | B2 | 12/2012 | Nickerson et al. | |
| 8,417,713 | B1 | 4/2013 | Blair-Goldensohn et al. | |
| 8,447,643 | B2 * | 5/2013 | Barnes, Jr. | 705/7.29 |
| 2004/0049534 | A1 * | 3/2004 | Nickerson et al. | 709/203 |
| 2006/0224500 | A1 * | 10/2006 | Stane et al. | 705/38 |
| 2006/0242600 | A1 * | 10/2006 | Pradhan et al. | 715/831 |
| 2007/0106659 | A1 * | 5/2007 | Lu et al. | 707/5 |
| 2007/0124283 | A1 * | 5/2007 | Gotts et al. | 707/3 |
| 2007/0168245 | A1 * | 7/2007 | de Marcken et al. | 705/8 |
| 2007/0192163 | A1 * | 8/2007 | Barr | 705/10 |
| 2008/0178081 | A1 * | 7/2008 | Reshef et al. | 715/700 |
| 2008/0215589 | A1 * | 9/2008 | Elhaik | 707/10 |
| 2008/0244431 | A1 * | 10/2008 | Chea et al. | 715/764 |
| 2008/0275719 | A1 * | 11/2008 | Davis et al. | 705/1 |
| 2010/0332522 | A1 * | 12/2010 | Steidley | 707/769 |
| 2011/0106721 | A1 * | 5/2011 | Nickerson et al. | 705/347 |

FOREIGN PATENT DOCUMENTS

| | | | |
|---|---|---|---|
| WO | 0103036 | A1 | 1/2001 |
| WO | 0125947 | A1 | 4/2001 |
| WO | 0127805 | A2 | 4/2001 |

* cited by examiner

*Primary Examiner* — Matt Kim
*Assistant Examiner* — Mahelet Shiberou
(74) *Attorney, Agent, or Firm* — Bracewell & Giuliani LLP (57) ABSTRACT

Methods, systems, and apparatus, including computer programs encoded on a computer storage medium, for receiving a search query for ratable entities, identifying at least one ratable entity responsive to the search query, and sending a webpage to a client device, the webpage including instructions that cause the client device to display one of a plurality of interfaces of a rating card for the at least one ratable entity, including instructions to initially display a first interface having a first graphical user interface (GUI) element for receiving a rating input, and instructions to display a second interface having a second GUI element upon receiving input in the first GUI element of the first interface.

14 Claims, 8 Drawing Sheets

RATING AND REVIEW INTERFACE

TECHNICAL FIELD

The present disclosure relates to a rating interface for reviewing and rating entities.

BACKGROUND

Various websites and applications ("rating services") enable consumers to provide ratings and reviews of establishments, such as restaurants, diners, cafés, theaters, etc. The rating services can aggregate the multiple reviews for each establishment and provide a summary of the aggregated reviews for each establishment.

SUMMARY

Innovative aspects of the subject matter described in this specification may be embodied in methods that include the actions of receiving a search query for ratable entities, identifying at least one ratable entity responsive to the search query, and sending a webpage to a client device, the webpage including instructions that cause the client device to display one of a plurality of interfaces of a rating card for the at least one ratable entity, including instructions to initially display a first interface having a first graphical user interface (GUI) element for receiving a rating input, and instructions to display a second interface having a second GUI element upon receiving input in the first GUI element of the first interface. Other embodiments of these aspects include corresponding systems, apparatus, and computer programs, configured to perform the actions of the methods, encoded on computer storage devices.

These and other embodiments may each optionally include one or more of the following features. For instance, the first GUI element for the first interface includes a user-selectable rating scale; the second GUI element for the second interface includes a user-editable comments box; actions further include: receiving a comment about the at least one ratable entity based on user interaction with the second GUI element of the second interface of the rating card for the at least one ratable entity, and storing the comment for the at least one ratable entity in a data repository; the webpage further includes instructions to display a third interface having a third GUI element upon receiving input in the second GUI element of the second interface; the third GUI element for the third interface includes a plurality of rating categories, with each rating category including pre-defined selectable rating inputs; actions further include: receiving a rating for at least one rating category for the at least one ratable entity based on user interaction with the third GUI element for the third interface of the rating card for the at least one ratable entity, and storing the rating for the at least one rating category in a data repository; and actions further include: receiving a rating for the at least one ratable entity based on user interaction with the first GUI element of the first interface of the rating card for the at least one ratable entity, and storing the rating for the at least one ratable entity in a data repository.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes systems, methods, computer programs, and storage media for providing one or more ratings graphical user interfaces (GUIs) for reviewing and rating entities. In some implementations, each ratings GUI can be graphically represented as a ratings card that is associated with a ratable entity. For purposes of illustration, the term ratings card will be used when referring to a ratings GUI.

In some implementations, a user that is interested in rating entities (e.g., restaurants, diners, cafés, theaters, etc.) can provide a search query to a search engine. The search engine can process the search query and corresponding search results can be generated. The search results can be provided in the form of one or more ratings cards, each ratings card being associated with a ratable entity that is identified based on the search query. The ratings cards each include multiple ratings interfaces that are displayed to the user in a step-by-step process to guide the user in providing ratings and review data. In some examples, each ratings card can be displayed to include a first interface. In some examples, each ratings card can also provide information regarding the corresponding ratable entity. In response to user input to the first interface, a second interface of the ratings card is displayed. In response to user input to the second interface, a third interface of the ratings card can be displayed.

Figure 1:
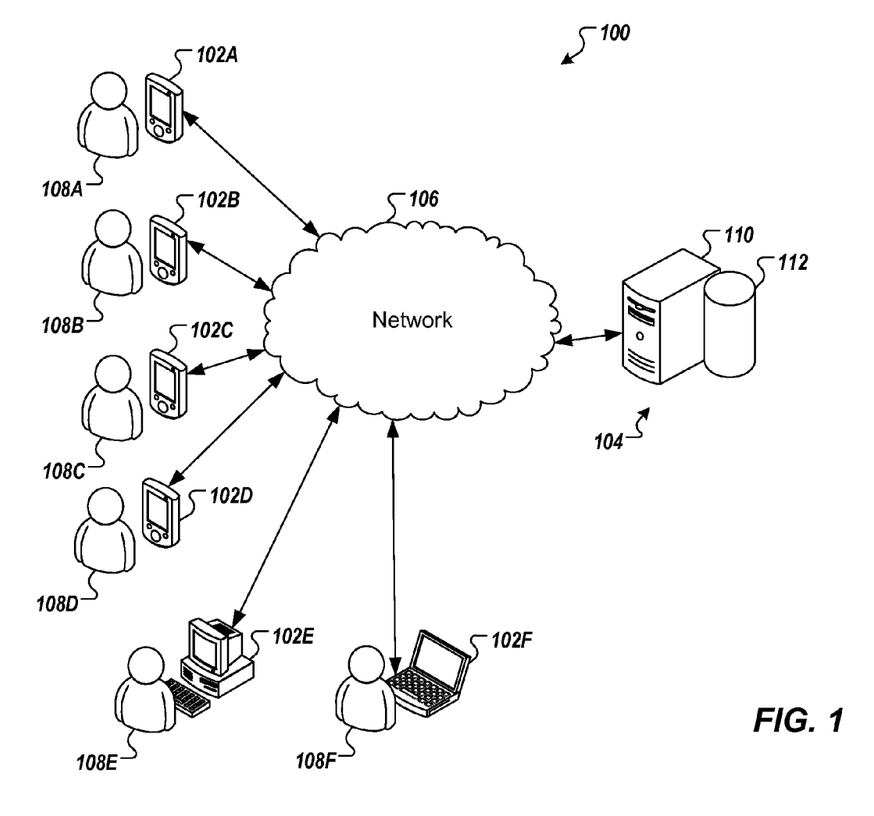
FIG. 1 is a diagram of an example system that can execute implementations of the present disclosure.

FIG. 1 is a diagram of an example system 100 that can execute implementations of the present disclosure. The system 100 includes computing devices 102A-102F that can each communicate with a server system 104 over a network 106. Each of the computing devices 102A-102F includes an associated user 108A-108F, respectively. The network 106 can include a large computer network, such as a local area network (LAN), a wide area network (WAN), the Internet, a cellular network, or a combination thereof connecting any number of mobile computing devices, fixed computing devices and server systems. The server system 104 includes one or more computing devices 110 and one or more machine-readable repositories, or databases 112.

In the example system 100, the computing devices 102A-102D are illustrated as mobile computing devices, the computing device 102E is illustrated as a desktop-type computing device and the computing device 102F is illustrated as a laptop-type computing device. It is appreciated, however, that the computing devices 102A-102F can each include any type of computing device such as a desktop computer, a laptop computer, a handheld computer, a personal digital assistant (PDA), a cellular telephone, a network appliance, a camera, a smart phone, an enhanced general packet radio service (EG-PRS) mobile phone, a media player, a navigation device, an email device, a game console, or a combination of any two or more of these data processing devices or other data processing devices.

In some implementations, the server system 104 can include one or more server computing devices (e.g., computing devices 110) and one or more computer-readable media (e.g., databases 112). The one or more computer-readable media can be coupled to the server computing device and can have instructions stored thereon which, when executed by the server computing device, cause the server computing device to perform server-side operations. Example server-side operations can include serving one or more web page documents to a client computing device operated by a user, each document containing instructions for a browser application to perform client-side operations. Example server-side operations can include receiving user input (e.g., user input that is provided to a client computing device and that is transmitted to the server computing device.

Figure 2:
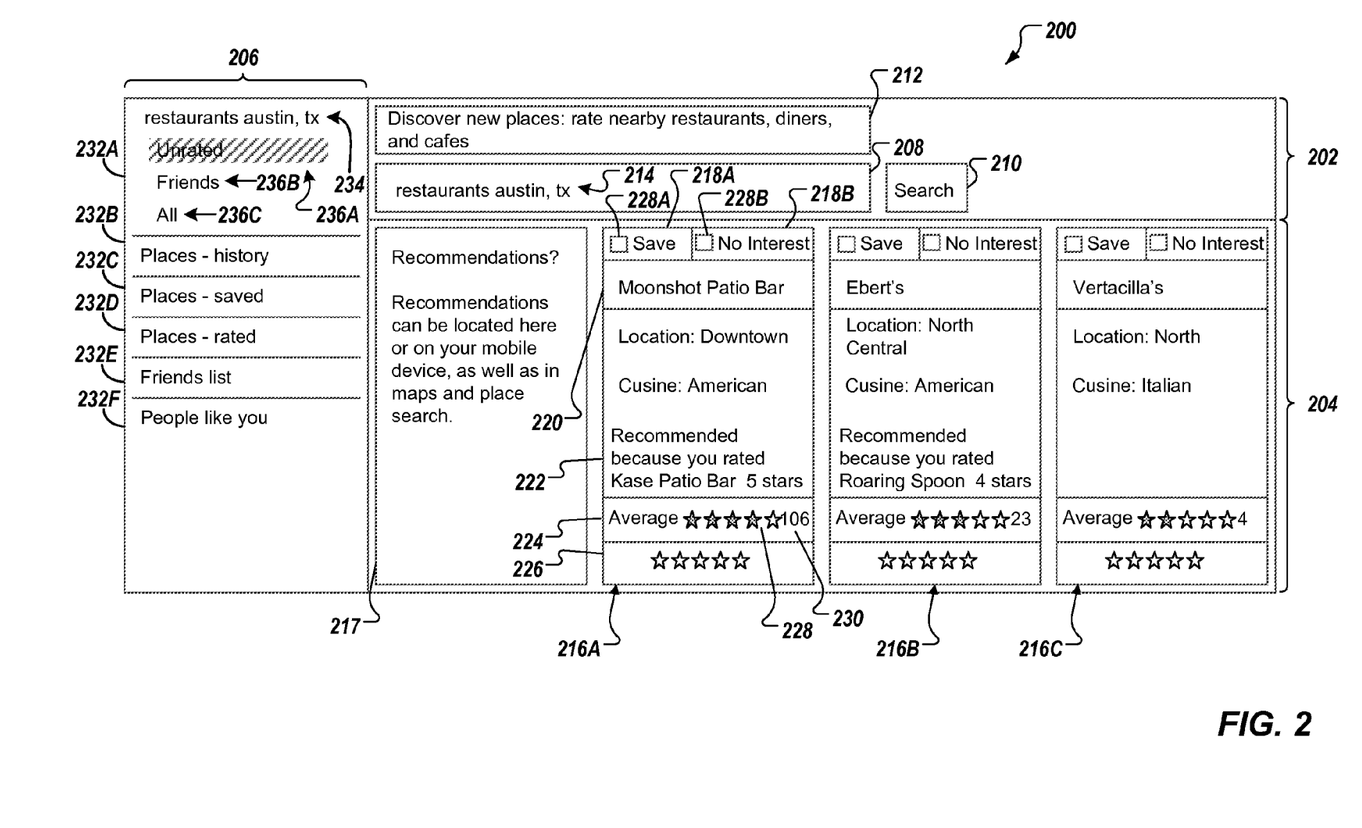
FIG. 2 depicts an example graphical user interface (GUI) that can be displayed to a user.

FIG. 2 depicts an example GUI 200 that can be displayed to a user. In the depicted example, a plurality of ratings cards can be displayed in the GUI 200. The GUI 200 includes a searching region 202, a display region 204, and a sidebar 206. The searching region 202 includes a search query field 208, a search button 210, and a title bar 212.

A user (such as any user 108A-108F) that is interested in a ratable entity (such as a restaurant, diner, café, or theatre) can enter a search query 214 into the search query field 208 to generate search results corresponding to the search query 214. In some examples, the search results can include information about one or more ratable entities and recommendations, reviews and/or ratings of the ratable entities. A ratable entities search engine can process the search query 214 and can generate the search results based in the search query. In some examples, the ratable entities search engine can be provided as one or more computer program applications that are executed using on or more computing devices (e.g., a server system).

In accordance with implementations of the present disclosure, the search results can be graphically represented as one or more ratings cards 216A-216C (collectively referred to as ratings cards 216). Each search result can correspond to a respective ratings card. The ratings cards 216 can be displayed in the display region 204 of the GUI 200. Although three search results and corresponding ratings cards are provided in the depicted example, it is appreciated that the search results can include more or fewer search results and corresponding ratings cards.

In the depicted example, the user can be interested in restaurants in the Austin, Tex. area and can input the search terms "restaurants Austin, Tex." into the search query field 208 as the search query 214. The ratable entities search engine can receive the search query 214 and generates the search results. The search results can be provided to a ratings application that displays the search results as respective ratings cards 216. In the depicted example, each ratings card 216 is associated with a restaurant located in Austin, Tex. In some implementations, only a subset of the total of ratings cards 216 that are associated with search results of the search query 214 "restaurants Austin, Tex." are displayed in the GUI 200. In the depicted example, the GUI 200 is capable of displaying three ratings cards 216 (ratings cards 216A-216C) at a time. In some implementations, the GUI 200 is scrollable such that additional ratings cards 216 can be displayed on the GUI 200. In some implementations, an information card 217 can be provided and can display information about the ratable entities search engine and/or other information.

Each ratings card 216 includes information about the associated ratable entity and provides a plurality of interfaces for a user to provide ratings/reviews about the associated ratable entity, described further below. As shown in FIG. 2, the ratings cards 216 each include selection tabs 218A and 218B (collectively referred to as selection tabs 218), a ratable entity title section 220, an information section 222, a historical ratings section 224, and a first interface 226. The selection tab 218A provides for saving the associated ratings card 216 for later view, such as by selecting a selection box 228A. The selection tab 218B provides for marking the associated ratings card 216 as not interested, such as by selecting a selection box 228B. In some implementations, marking the ratings card 216 as not interested results in dismissing (i.e., removing) the associated ratings card 216 from the display region 204.

The information section 222 can include information pertaining to the ratable entity, such as location, cuisine (for a restaurant rating card), and recommendation reasoning (i.e., why the entity was recommended to the user, for example, based on previous ratings of similar ratable entities). For example, the information section 222 of ratings card 216A includes information of ratable entity "Moonshot Patio Bar" including downtown location, American cuisine, and recommendation reasoning of "because you rated Kase Patio Bar 5 stars." In some implementations, the information section 222 includes other information pertaining to the ratable entity, such as pricing. In some implementations, at least one of the information sections 222 of the ratings cards 216 includes differing amounts of information pertaining to the respective ratable entity. For example, information section 222 of ratings card 216C includes location and cuisine information, but does not include recommendation reasoning.

The historical ratings section 224 includes a historical rating of the associated ratable entity of the ratings cards 216. The historical ratings section 224 includes a ratings average 228 and a total number of ratings 230. The ratings average 228 is the average of all ratings associated with the ratable entity of the ratings card 216. As shown, the ratings average 228 is represented as stars, with "filled" stars representing the average rating of the associated rating entity of the ratings card 216. For example, the ratings average 228 of ratings cards 216A is 4 stars. In some implementations, the ratings averages 228 can include other representations of the rating of the associated rating entity of the ratings card 216, for example, a numerical ranking. The total ratings 230 is the total number of ratings associated with the ratable entity of the ratings card 216, i.e., the total number of times the ratable entity has been rated. The total ratings 230 can be used in calculation of the ratings average 228. In some implementations, the ratings associated with the ratable entity of the ratings car 216 are submitted by users (such as users 108A-108F).

The sidebar 206 provides further navigation of the display region 204. The side bar 206 includes a current search category 232A, a historical places category 232B, a saved places category 232C, a rated places category 232D, a friends list category 232E, and similar people category 232F (collectively referred to as categories 232). The categories 232 are selectable such that, when selected, the information that is displayed in display region 204, such as the ratings cards 216, is altered, as described below.

The current search category 232A includes a heading 234 identifying the search query 214 and subcategories 236A-236C. When one of subcategories 236A-236C (collectively referred to as subcategories 236) is selected, the ratings cards 216 that are provided in response to the search query 214 are filtered. Specifically, the ratings engine provides the ratings cards 216 in view of the search query 214. The selection of one of the subcategories 236 filters the ratings cards 216 such that only the ratings cards 216 related to the selected subcategory 236 are displayed on the GUI 200. For example, when the subcategory 236A is selected, the ratings cards 216 are filtered to only include "unrated" ratings cards 216 in view of the search query 214 (i.e., ratings cards associated with ratable entities that the searching user has not yet rated, although other users may have already rate). Furthermore, the subcategory 236B relates to "friends" and the subcategory 236C relates to "all" such that when selected, the ratings card 216 are filtered such that the user will only view ratings cards associated with ratable entities that have been rated by one or more contacts (e.g., "friends") of the searching users, or all ratings cards corresponding to the search query 214, respectively.

When selected, the historical places category 232B, displays within the display region 204 the ratings cards 216 that are associated with a previously submitted search query. For example, a user may have previously submitted a search query 214 relating to "cafes Austin, Tex." When the historical places category 232B is selected, a listing of the search query 214 and/or the ratings cards related to the search query 214 of "cafes Austin, Tex." can be provided in the display region 204.

The saved places category 232C provides, when selected, in the display region 202, the ratings cards 216 that have been previously saved. For example, as mentioned above, the ratings cards 216 include the selection tab 218A that when selected, saves the ratings card 216 for later view, such as when the saved places category 232C is selected. The rated places category 232D provides, when selected, in the display region 202, the ratings cards 216 that have been previously rated. For example, when one or more of the ratings cards 216 is rated, explained further below, the rated ratings cards 216 are displayed in the display region 202.

The friends list category 232E provides, when selected, a listing of all friends (such as the users 108A-108F) of the searching user providing the search query 214. The similar people category 232F provides, when selected, other users (such as the users 108A-108F) that are determined, by the ratings engine, to be similar to the searching user providing the search query 214. The ratable entities search engine can use any appropriate algorithm to determine the similarity between two users and can be based on a similarity of what ratable entities are rated by the two users and how the two users rated the same ratable entities. For example, if the two users have rated the same ratable entities, the two users are more likely to be considered similar since they have similar interest in the two entities. Additionally, if the two users have rated the same ratable entities with similar ratings, the two users are more likely to be considered similar, since they hold the same view of the two entities.

As mentioned above, the ratings cards 216 include the first interface 226. The first interface 226 provides a ranking interface for the user to provide input for rating the ratable entity associated with the ratings cards 216. For example, the first interface 226 can include a user-selectable rating scale such as a star rating scale (1 to 5 stars). The user can provide input to the first interface 226 to rate the ratable entity associated with the ratings card 216 by selecting 1, 2, 3, 4, or 5 stars to be associated with the ratable entity. In some implementations, the first interface 226 can include any type of rating scale, for example, a number rating scale.

Figure 3:
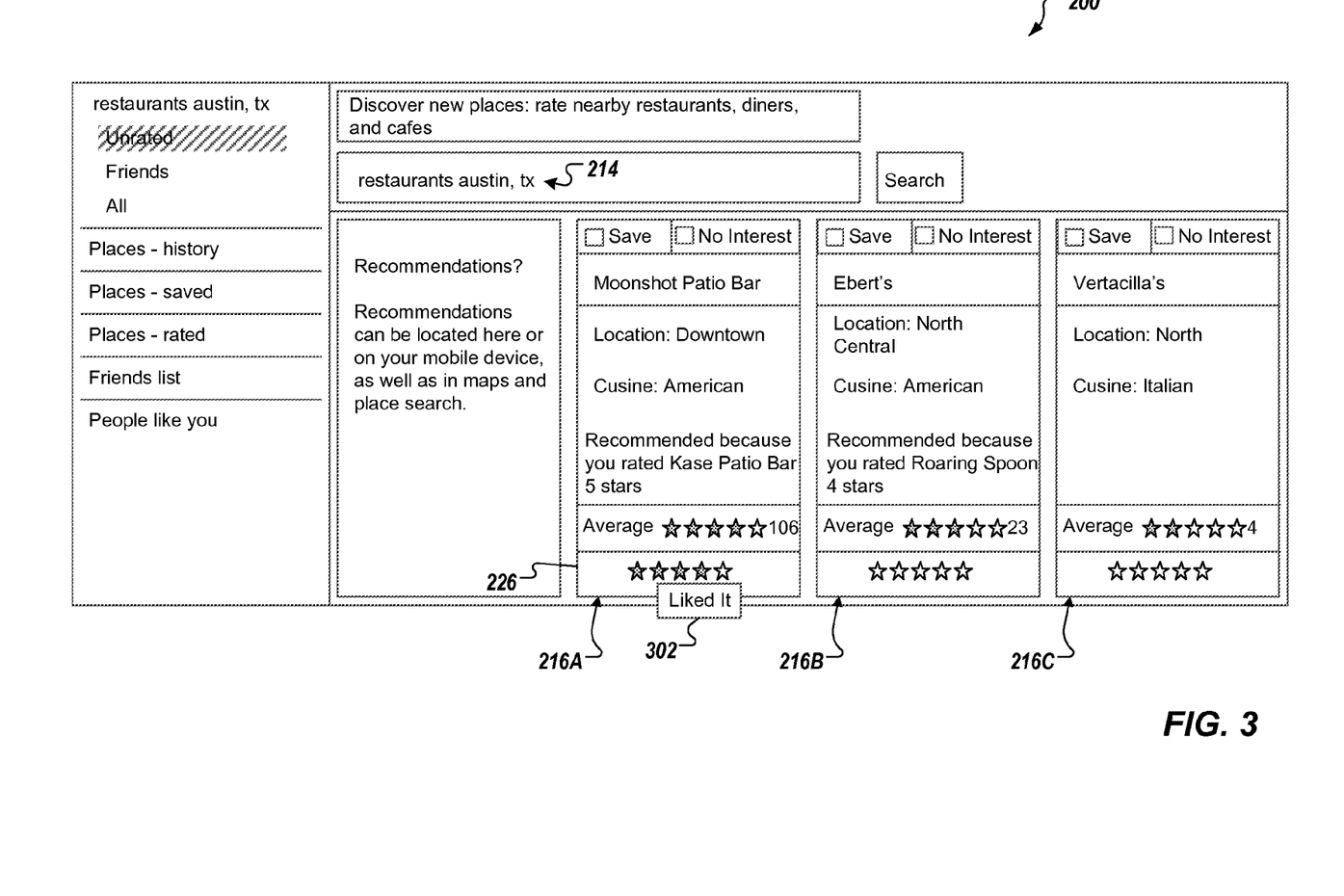
FIG. 3 depicts input received by a first interface of a ratings card.

FIG. 3 depicts input received by the first interface 226 of the ratings card 216A. Specifically, the searching user that provided the search query 214 provides a rating of the ratable entity of the associated ratings card 216 by selecting a desired number of stars. The user can select the desired number of stars by input means such as controlling a cursor (not shown) by an input device (e.g., a mouse (not shown)), and hovering over the stars until a desired number of stars are "filled" or "highlighted." For example, the user can rate the ratable entity "Moonshot Patio Bar" of the ratings card 216A with 4 stars.

The user can select the appropriate number of stars by selecting (e.g., clicking on) one of the stars (i.e., if 4 stars are desired to rate the ratable entity, the $4^{th}$ star from the left is the selected rating). In some implementations, each star has an associated hover over box 302. The hover over box 302 is a box that can be displayed adjacent the associated star indicating additional information associated with the star. For example, the fourth star has the associated hover over box 302 "Liked It." This can help the user in determining how many stars to rank the ratable entity associated with the ratings card 216. The other stars can have similar associated hover over boxes 302.

Figure 4:
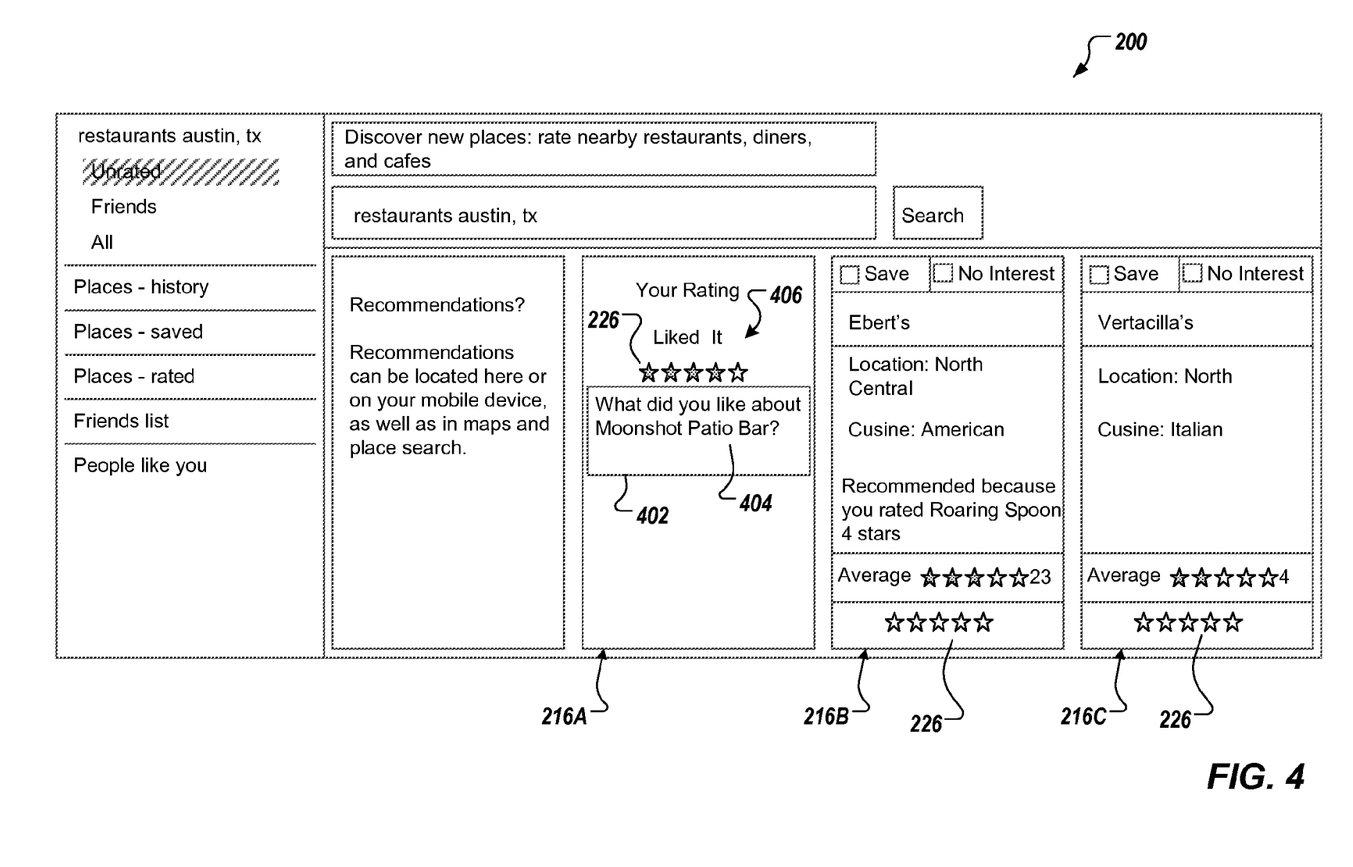
FIG. 4 depicts a second interface of a ratings card that is displayed in response to receiving rating input to the first interface.

FIG. 4 depicts a second interface 402 of the ratings card 216A that is displayed in response to receiving rating input to the first interface 226 (e.g., selecting the number of stars for the ratable entity of the ratings card 216A). In some examples, the graphical representation of the ratings card 216A can be animated to depict flipping of the ratings card 216A, implying that the second interface 402 is provided on a reverse side of the ratings card 216A than a side originally displayed in the search results. The second interface 402 is a further ranking interface, into which the user can provide input about the ratable entity associated with the ratings cards 216. For example, in response to the first interface 226 of the ratings card 216A receiving rating input, the ratings card 216A is re-displayed to include the second interface 402. In some implementations, only after receiving input to the first interface 226 will the second interface 402 of the ratings cards 416 be displayed. In some implementations, when the ratings card 216A receives user input to the first interface 226, the ratings card 216A is re-displayed to provide the second interface 402. In some examples, the other ratings cards 216B and 216C remain unchanged.

In some implementations, the second interface 402 is provided as a comments box. The user can provide input to the second interface 402 including comments about the ratable entity of the ratings card 216A. The user can provide input to the second interface 402 by selecting the second interface 402 by input means such as clicking a cursor (not shown) by an input device and inputting text via an input device. In some implementations, upon initially displaying the second interface 402, the second interface 402 can include text 404 to facilitate in guiding the user to input comments into the second interface 402. For example, the second interface 402 of the ratings card 216A can initially include the text "What did you like about Moonshot Patio Bar?" In addition to displaying the second interface 402 in response to receiving input to the first interface 226, the ratings card 216A can include a summary 406 of the rating received through the first interface 226. In some implementations, the summary 406 includes the star rating of the first interface 226 and the text of the associated hover box 302. For example, the summary 406 of the ratings card 216A includes the "4 star rating" and the "Liked It" text. In some implementations, the first interface 226 can be re-displayed within the summary 406. In this manner, the user can change the rating initially provided to the first interface 226.

Figure 5:
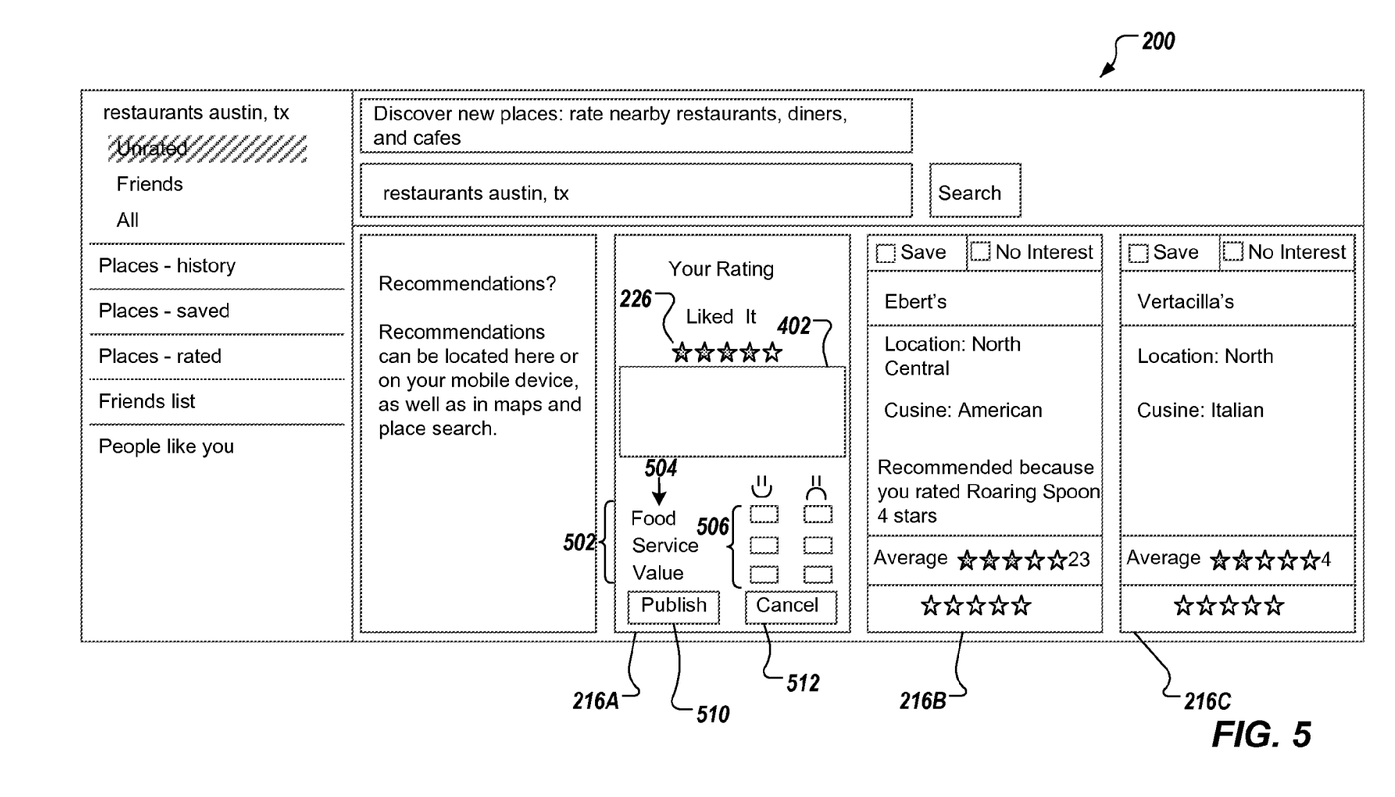
FIG. 5 depicts a third interface of the ratings card that is displayed in response to receiving input to the second interface.

FIG. 5 depicts a third interface 502 of the ratings card 216A that is displayed in response to receiving input to the second interface 402. For example, the third interface 502 can be displayed in response to the user selecting the second interface 402 of the ratings cards 216A (e.g., by "clicking" within the second interface 402). The third interface 502 is a further rating interface for the user to provide input about the ratable entity associated with the respective ratings card 216A, as described further below. In some examples, the third interface 502 of the ratings cards 216A is be displayed only after receiving input to the second interface 402 (e.g., clicking within the second interface 402 or providing comments). In some implementations, the second interface 402 is displayed concurrently with displaying the third interface 502. In some implementations, the first interface 226, the second interface 402 and the third interface 502 can be concurrently displayed.

In some examples, the third interface 502 includes a listing of rating categories 504 associated with the ratable entity of the ratings cards 216A. The rating categories 504 include predefined categories associated with the type of the ratable entity to assist the user in rating the ratable entity of the respective ratings card 216A. For example, the ratings categories 504 associated with a food-service ratable entity can include "Food," "Service," and "Value." The ratings categories can vary from ratings card to ratings card based on the type of the ratable entity associated with the ratings cards. For example, a ratings card associated with a restaurant can have different ratings categories than a ratings card associated with a theater. Each rating category 504 can include predefined selectable rating inputs 506. The rating inputs 506 can be provided as user-selectable boxes that rate the respective ranking category 504 for the respective ratable entity with predefined ratings. For example, the rating inputs 506 are associated with the predefined ratings of "good" (shown as a happy face) or "bad" (shown as a frown face). In some implementations, the rating inputs 506 can be associated with a rating scale (e.g., a star rating scale or a numerical rating scale).

Figure 6:
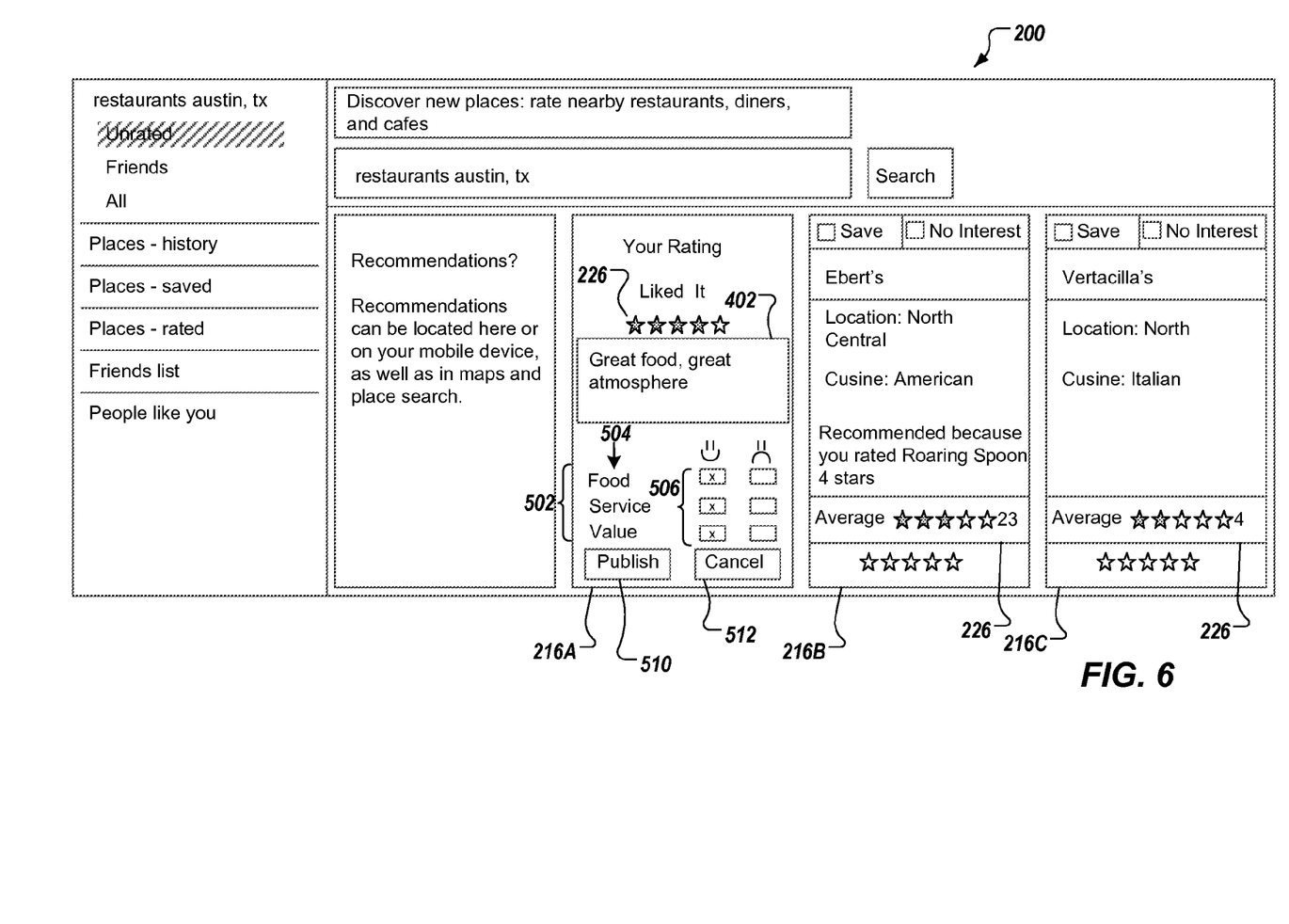
FIG. 6 depicts the second interface and the third interface of the ratings card after user rating input has been received to each.

FIG. 6 depicts the second interface 402 and the third interface 502 of the ratings cards 216A after user rating input has been received in each. Specifically, in response to selecting the second interface 402 (e.g., "clicking" the second interface 402) of one of the ratings cards 216A, the user can provide input to the second interface 402, including comments about the ratable entity associated with the ratings card 216. For example, the user provides comments about the ratable entity "Moonshot Patio Bar" of the ratings card 216A including "great food, casual atmosphere." The user can provide input to the third interface 502 by selecting one of the rating inputs 506 for one or more of the rating categories 504 by input means (e.g., clicking a cursor using an input device). For example, the user selects the "good" rating input 506 for each of the rating categories 504 of the third interface 502 of the ratings card 216A.

The ratings cards 216 can further provide a "publish" button 510 and a cancel button 512. In response to user activation (e.g., clicking on) the publish button 510, the ratings information input by the user to the corresponding ratings card 516 can be published. In some examples, the ratings information input by the user is stored in an index associated with the ratable entity that is associated with the particular ratings card 216. In some examples, publication of the ratings information can include making the ratings information available to other users that can be seeking ratings/reviews of the particular ratable entity and/or providing ratings/reviews of ratable entities. In some examples, the ratings information can be published anonymously, such that other users that review the ratings information are unaware of the source of the ratings information. In response to user activation (e.g., clicking on) the cancel button 512, ratings information provided to the first interface 226, the second interface 402 and the third interface 502 can be cleared without publication and/or storage of the ratings information.

Figure 7:
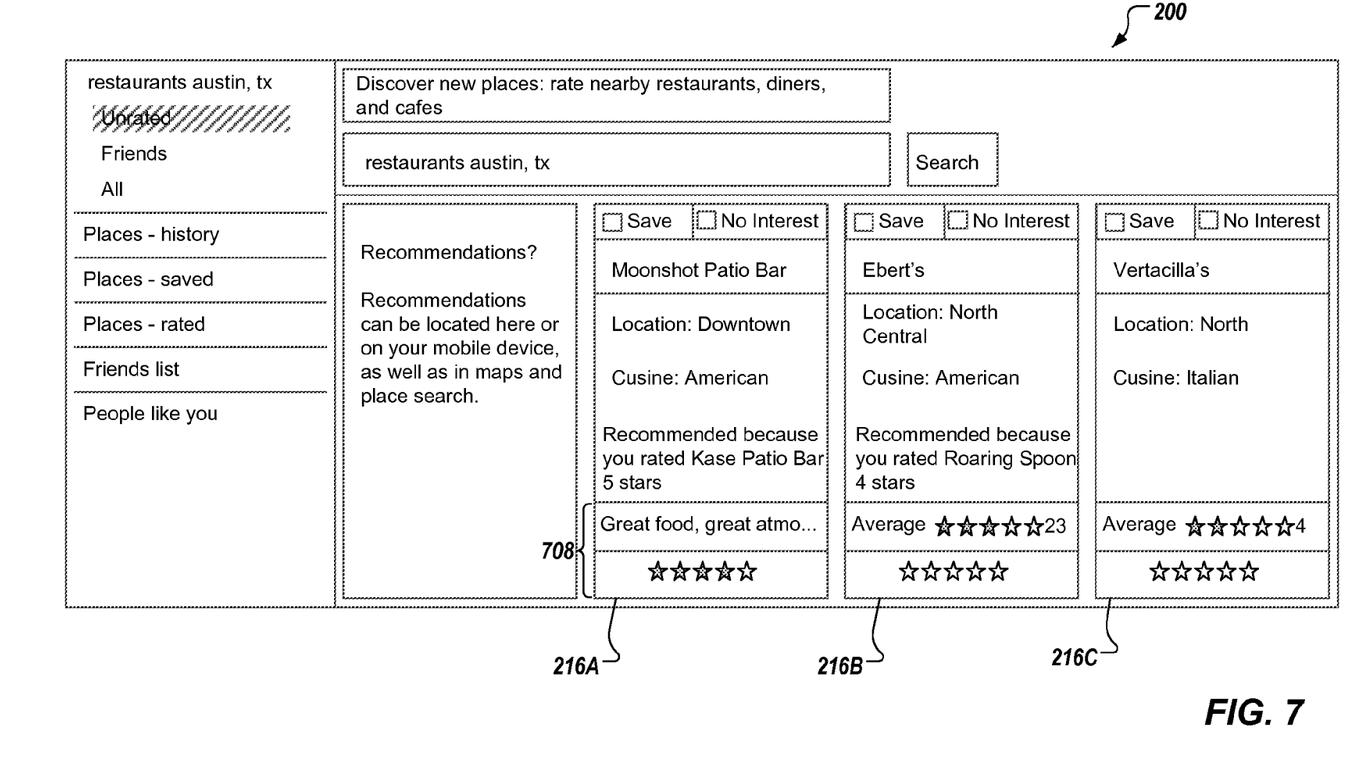
FIG. 7 depicts the ratings card in response to receiving input by the third interface.

FIG. 7 depicts the ratings cards 216 in response to publication of ratings information. In some examples, the user can activate (e.g., click on) the publish button 510, as discussed above. In response to activation of the publish button 510, the graphical representation of the ratings card 216A can be animated to depict flipping of the ratings card 216A back to the side displayed in FIG. 2, for example. In some examples, and in response to publication of the ratings information, the ratings card 216A can include a ratings summary 708. The ratings summary 708 includes a summary of ratings information that was provided by the user using the first interface 226, the second interface 402, and/or the third interface 502, as discussed above. For example, the ratings summary 708 of ratings card 216A includes the rankings information received by the first interface 226 (the 4 star rating) and the second interface 402 (the comments). In some implementations, a portion of the ratings information received by the second interface 402 is displayed in the ratings summary 708.

In some implementations, the user can provide ratings to the remaining ratings cards 216B and 216C after providing the ratings to the ratings cards 216A. In some implementations, the user can provide ratings to the remaining ratings cards 216B and 216C concurrently with providing ratings to the ratings card 216A. For example, and referring again to FIG. 2, the user 402 can provide ratings information to the second interface 402 of the ratings card 216A and can provide ratings information to the first interface 226 of the ratings card 2168 and/or the ratings card 216C.

Figure 8:
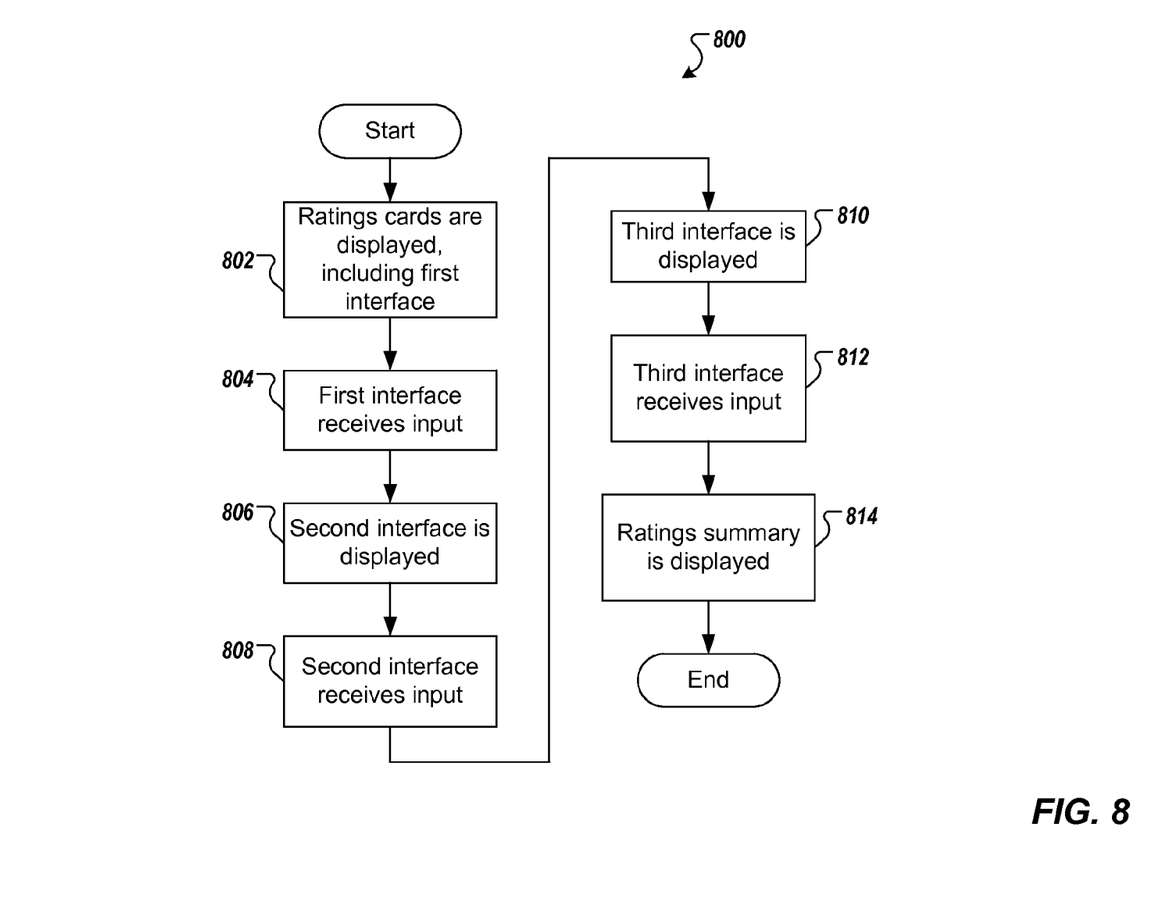
FIG. 8 is a flowchart of an example process for displaying ratings cards for reviewing and rating entities.

FIG. 8 is a flowchart of an example process 800 for displaying ratings cards for reviewing and rating entities. The example process 800 can be executed using one or more computing devices. For example, the computing devices 102 and/or the server system 104 can be used to execute the example process 800.

Ratings cards are displayed, each ratings card associated with a ratable entity and including a first interface (802). For example, the ratings cards 216 are displayed on the GUI 200 of FIG. 2. The ratings cards 216 are associated with a ratable entity, such as ratings card 216A associated with the ratable entity "Moonshot Patio Bar." The ratings cards 216 include the first interface 226, such as a user-selectable rating scale (e.g., a star rating).

The first interface of a first ratings card receives first user input, the first user input including a rating (804). For example, the first interface 226 receives input from a user (such as one of the users 108A-108F) to rate the ratable entity ("Moonshot Patio Bar") associated with the ratings card 216A by selecting 1, 2, 3, 4, or 5 stars, as shown in FIG. 3.

In response to receiving the first user input, a second interface of the first ratings card is displayed and the rating is displayed within the second interface of the first ratings card (806). For example, in response to the first interface 226 of the ratings card 216A receiving the rating of 1, 2, 3, 4, or 5 stars, the second interface 402 of the ratings card 216A, is displayed as shown in FIG. 4. Further, the second interface of the ratings card 216A includes the summary 406 of the rating received by the first interface 226, such as the star rating of 4 stars.

The second interface of the first ratings card receives second user input (808). For example, the second interface 402 receives input from a user (such as one of the users 108A-108F) to provide additional information on the ratable entity ("Moonshot Patio Bar") associated with the ratings card 216A by receiving a selection (e.g., clicking) on the second interface 402 with a cursor (not shown), as shown in FIG. 5.

In some implementations, the input to the second interface 402 includes receiving comments ("Great food, great atmosphere") to a comment box, as shown in FIG. 6.

In response to receiving the second user input, a third interface of the first ratings card is displayed (810). For example, in response to the second interface 402 of the ratings card 216A receiving a selection (e.g., a "click"), the third interface 502 of the ratings card 216A is displayed as shown in FIG. 5. Further, for example, in response to receiving comments in the second interface 402 of the ratings card 216A, the third interface 502 of the ratings card 216A is displayed as shown in FIG. 6.

The third interface of the first ratings card receives third user input (812). For example, the third interface 502 receives input from a user (such as one of the users 108A-108F), such as selection of one of the ranking inputs 506 ("good" or "bad") for one or more of the ranking categories 504 ("Food," "Value," "Service"), as shown in FIG. 6.

In response to receiving the third user input, a ratings summary of the first ratings card is displayed (814). For example, in response to receiving the selection of rating inputs 506 for one or more of the rating categories 504 in the third interface 502 of the ratings card 216A, the ratings summary 708 of the ratings card 216A is displayed.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this present disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer implemented method for providing ratable search results, comprising:
receiving a search query for ratable entities;
identifying at least one ratable entity responsive to the search query; and
sending a webpage including search results responsive to the search query to a client device, the webpage comprising instructions that cause the client device to display a plurality of interfaces of a plurality of rating cards for a plurality of ratable entities including the at least one ratable entity, including instructions to initially display in the webpage a first interface on a side of a given one of the ratings cards, the first interface having a first graphical user interface (GUI) element for receiving a rating input, instructions to display in the webpage an animation to depict flipping of the given ratings card in the webpage to a reverse side upon receiving input in the first GUI element of the first interface, and instructions to display in the webpage a second interface on the reverse side of the given ratings card, the second interface having a second GUI element upon receiving input in the first GUI element of the first interface, wherein the second GUI element for the second interface includes a user-editable comments box.

2. The method of claim 1, wherein the first GUI element for the first interface includes a user-selectable rating scale.

3. The method of claim 1, further comprising:
receiving a comment about the at least one ratable entity based on user interaction with the second GUI element of the second interface of the given rating card for the at least one ratable entity; and
storing the comment for the at least one ratable entity in a data repository.

4. The method of claim 1, wherein the webpage further comprises instructions to display a third interface having a third GUI element upon receiving input in the second GUI element of the second interface.

5. The method of claim 4, wherein the third GUI element for the third interface includes a plurality of rating categories, with each rating category including pre-defined selectable rating inputs.

6. The method of claim 5, further comprising:
receiving a rating for at least one rating category for the at least one ratable entity based on user interaction with the third GUI element for the third interface of the given rating card for the at least one ratable entity; and
storing the rating for the at least one rating category in a data repository.

7. The method of claim 1, further comprising:
receiving a rating for the at least one ratable entity based on user interaction with the first GUI element of the first interface of the given rating card for the at least one ratable entity; and
storing the rating for the at least one ratable entity in a data repository.

8. A system for providing ratable search results, comprising:
one or more memory elements storing instructions;
one or more processors coupled to the one or more memory elements and executing the instructions thereon in order to:
receive a search query for ratable entities;
identify at least one ratable entity responsive to the search query; and
send a webpage including search results responsive to the search query to a client device, the webpage comprising instructions that cause the client device to display a plurality of interfaces of rating cards for a plurality of ratable entities including the at least one ratable entity, including instructions to initially display in the webpage a first interface on a side of a given one of the ratings cards, the first interface having a first graphical user interface (GUI) element for receiving a rating input, instructions to display in the webpage an animation to depict flipping of the given ratings card in the webpage to a reverse side upon receiving input in the first GUI element of the first interface, and instructions to display in the webpage a second interface on the reverse side of the given ratings card, the second interface having a second GUI element upon receiving input in the first GUI element of the first interface, wherein the second GUI element for the second interface includes a user-editable comments box.

9. The system of claim 8, wherein the first GUI element for the first interface includes a user-selectable rating scale.

10. The system of claim 8, wherein the one or more processors further execute the instructions in order to:
receive a comment about the at least one ratable entity based on user interaction with the second GUI element of the second interface of the given rating card for the at least one ratable entity; and
store the comment for the at least one ratable entity in a data repository.

11. The system of claim 8, wherein the webpage further comprises instructions to display a third interface having a third GUI element upon receiving input in the second GUI element of the second interface.

12. The system of claim 11, wherein the third GUI element for the third interface includes a plurality of rating categories, with each rating category including pre-defined selectable rating inputs.

13. The system of claim 12, wherein the one or more processors further execute the instructions in order to:
receive a rating for at least one rating category for the at least one ratable entity based on user interaction with the third GUI element for the third interface of the given rating card for the at least one ratable entity; and
store the rating for the at least one rating category in a data repository.

14. The system of claim 8, wherein the one or more processors further execute the instructions in order to:
receive a rating for the at least one ratable entity based on user interaction with the first GUI element of the first interface of the given rating card for the at least one ratable entity; and
store the rating for the at least one ratable entity in a data repository.

* * * * *